(12) United States Patent
Calundann et al.

(10) Patent No.: US 7,582,210 B2
(45) Date of Patent: *Sep. 1, 2009

(54) PROTON-CONDUCTING MEMBRANE AND USE THEREOF

(75) Inventors: Gordon Calundann, North Plainfield, NJ (US); Michael J. Sansone, Berkeley Heights, NJ (US); Oemer Uensal, Mainz (DE); Joachim Kiefer, Losheim Am See (DE)

(73) Assignee: BASF Fuel Cell GmbH (DE)

( * ) Notice: Subject to any disclaimer, the term of this patent is extended or adjusted under 35 U.S.C. 154(b) by 25 days.

This patent is subject to a terminal disclaimer.

(21) Appl. No.: 11/930,764

(22) Filed: Oct. 31, 2007

(65) Prior Publication Data

US 2008/0057358 A1 Mar. 6, 2008

Related U.S. Application Data

(62) Division of application No. 10/472,814, filed as application No. PCT/EP02/03900 on Apr. 9, 2002, now Pat. No. 7,384,552.

(30) Foreign Application Priority Data

Apr. 9, 2001 (DE) ................. 101 17 686

(51) Int. Cl.
- *B01D 39/00* (2006.01)
- *B01D 39/14* (2006.01)
- *C25B 13/00* (2006.01)
- *C22C 33/08* (2006.01)

(52) U.S. Cl. .............. 210/500.39; 210/500.27; 521/27; 204/296; 429/29; 429/30

(58) Field of Classification Search ........... 210/500.27, 210/500.38, 500.39; 429/33, 29, 30, 306; 521/27; 264/41; 204/296; 427/244
See application file for complete search history.

(56) References Cited

U.S. PATENT DOCUMENTS

| | | | |
|---|---|---|---|
| 3,313,783 A * | 4/1967 | Iwakura et al. ............. 528/336 |
| 4,191,618 A | 3/1980 | Coker et al. |
| 4,212,714 A | 7/1980 | Coker et al. |
| 4,333,805 A | 6/1982 | Davidson et al. |
| 5,525,436 A * | 6/1996 | Savinell et al. ............ 429/30 |
| 7,196,151 B2 * | 3/2007 | Haring .................. 526/240 |
| 7,202,237 B2 * | 4/2007 | Peters et al. ........... 514/212.01 |
| 7,235,320 B2 | 6/2007 | Calundann et al. |
| 7,288,603 B2 * | 10/2007 | Sakaguchi et al. .......... 525/411 |
| 7,332,530 B2 | 2/2008 | Kiefer et al. |
| 7,384,552 B2 * | 6/2008 | Calundann et al. ..... 210/500.38 |
| 7,445,864 B2 * | 11/2008 | Muellen et al. ............. 429/33 |
| 2004/0096734 A1 | 5/2004 | Calundann et al. |
| 2004/0247974 A1 | 12/2004 | Uensal et al. |
| 2004/0262227 A1 | 12/2004 | Kiefer et al. |
| 2005/0053820 A1 | 3/2005 | Calundann et al. |
| 2005/0074654 A1 | 4/2005 | Kiefer et al. |
| 2005/0084727 A1 | 4/2005 | Kiefer et al. |
| 2005/0118477 A1 | 6/2005 | Kiefer et al. |
| 2005/0118478 A1 | 6/2005 | Kiefer et al. |
| 2005/0147859 A1 | 7/2005 | Kiefer et al. |
| 2005/0175879 A1 | 8/2005 | Kiefer et al. |
| 2005/0181254 A1 | 8/2005 | Uensal et al. |
| 2005/0244694 A1 | 11/2005 | Kiefer et al. |
| 2005/0256296 A1 | 11/2005 | Kiefer et al. |
| 2006/0008690 A1 | 1/2006 | Uensal et al. |
| 2006/0035095 A1 | 2/2006 | Calundann et al. |
| 2006/0057449 A1 | 3/2006 | Calundann et al. |
| 2006/0078774 A1 | 4/2006 | Uensal et al. |
| 2006/0079392 A1 | 4/2006 | Baurmeister et al. |
| 2006/0166067 A1 | 7/2006 | Kiefer et al. |
| 2006/0183012 A1 | 8/2006 | Uensal et al. |
| 2006/0210881 A1 | 9/2006 | Calundann et al. |
| 2006/0234099 A1 | 10/2006 | Muellen |
| 2007/0102361 A1 | 5/2007 | Kiefer et al. |
| 2007/0292734 A1 | 12/2007 | Kiefer et al. |
| 2008/0026277 A1 | 1/2008 | Peterson et al. |
| 2008/0038624 A1 | 2/2008 | Belack et al. |

FOREIGN PATENT DOCUMENTS

| | | |
|---|---|---|
| DE | 10109829 A1 | 9/2002 |
| JP | 2001118591 | 4/2001 |
| WO | WO 02/088219 | 11/2002 |
| WO | WO 2006/117199 | 11/2006 |

* cited by examiner

*Primary Examiner*—Ana M Fortuna
(74) *Attorney, Agent, or Firm*—Connolly Bove Lodge & Hutz LLP

(57) ABSTRACT

The present invention relates to a novel proton-conducting polymer membrane based on polyazoles which can, because of its excellent chemical and thermal properties, be used in a variety of ways and is particularly useful as polymer electrolyte membrane (PEM) to produce membrane electrode units for PEM fuel cells.

23 Claims, No Drawings

PROTON-CONDUCTING MEMBRANE AND USE THEREOF

RELATED APPLICATIONS

This application is a divisional of U.S. patent application Ser. No. 10/472,814, filed Dec. 24, 2003 and is a national stage application of PCT/EP02/03900 filed Apr. 9, 2002 which claims benefit to DE 101 17 686.4 filed Apr. 9, 2001.

The present invention relates to a novel proton-conducting polymer membrane based on polyazoles which can, because of its excellent chemical and thermal properties, be used in a variety of ways and is particularly useful as polymer electrolyte membrane (PEM) in PEM fuel cells.

Polyazoles such as polybenzimidazoles (®Celazole) have been known for a long time. The preparation of such polybenzimidazoles (PBI) is usually carried out by reacting 3,3', 4,4'-tetraaminobiphenyl with isophthalic acid or diphenylisophthalic acid or their esters in the melt. The prepolymer formed solidifies in the reactor and is subsequently comminuted mechanically. The pulverulent prepolymer is subsequently fully polymerized in a solid-phase polymerization at temperatures of up to 400° C. to give the desired polybenzimidazoles.

To produce polymer films, the PBI is, in a further step, dissolved in polar, aprotic solvents such as dimethylacetamide (DMAc) and a film is produced by classical methods.

Proton-conducting, i.e. acid-doped, polyazole membranes for use in PEM fuel cells are already known. The basic polyazole films are doped with concentrated phosphoric acid or sulfuric acid and then act as proton conductors and separators in polymer electrolyte membrane fuel cells (PEM fuel cells).

Due to the excellent properties of the polyazole polymer, such polymer electrolyte membranes can, when converted into membrane-electrode units (MEEs), be used in fuel cells at continuous operating temperatures above 100° C., in particular above 120° C. This high continuous operating temperature allows the activity of the catalysts based on noble metals present in the membrane-electrode unit (MEE) to be increased. Particularly when using reforming products from hydrocarbons, significant amounts of carbon monoxide are present in the reformer gas and these usually have to be removed by means of a complicated gas work-up or gas purification. The ability to increase the operating temperature makes it possible to tolerate significantly higher concentrations of CO impurities in long-term operation.

The use of polymer electrolyte membranes based on polyazole polymers enables, firstly, the complicated gas work-up or gas purification to be omitted, at least in part, and, secondly, allows the catalyst loading in the membrane-electrode unit to be reduced. Both are indispensable prerequisites for wide use of PEM fuel cells since otherwise the costs of a PEM fuel cell system are too high.

The previously known acid-doped polymer membranes based on polyazoles display an advantageous property profile. However, an overall improvement in these properties has to be achieved in order to be able to use PEM fuel cells in the intended applications, in particular in the automobile sector and in decentralized power and heat generation (stationary applications). In addition, the polymer membranes known hitherto have a high content of dimethylacetamide (DMAc) which cannot be removed completely by means of known drying methods. The German patent application No. 10109829.4 describes a polymer membrane based on polyazoles in the case of which the DMAc contamination was eliminated. Although such polymer membranes display improved mechanical properties, the specific conductivity does not exceed 0.1 S/cm (at 140° C).

It is an object of the present invention to provide acid-containing polymer membranes based on polyazoles which, firstly, have the use advantages of the polymer membrane based on polyazoles and, secondly, display an increased specific conductivity, in particular at operating temperatures above 100° C., and additionally make do without humidification of the fuel gas.

We have now found that a proton-conducting membrane based on polyazoles can be obtained when the parent monomers are suspended or dissolved in polyphosphoric acid, spread to give a thin layer and polymerized in the polyphosphoric acid. In the case of this novel membrane, the specific after-treatment described in the German patent application No. 10109829.4, an additional preparation of the polymer solution and subsequent doping of the film can be dispensed with. The doped polymer membranes display a significantly improved proton conductivity.

The present invention provides a proton-conducting polymer membrane based on polyazoles which is obtainable by a process comprising the steps
A) Mixing of one or more aromatic tetraamino compounds with one or more aromatic carboxylic acids or esters thereof which contain at least two acid groups per carboxylic acid monomer, or mixing of one or more aromatic and/or heteroaromatic diaminocarboxylic acids, in polyphosphoric acid to form a solution and/or dispersion,
B) Application of a layer to a support or an electrode using the mixture from step A),
C) Heating of the flat structure/layer obtainable as described in step B) to temperatures of up to 350° C., preferably up to 280° C., under inert gas to form the polyazole polymer,
D) Treatment of the membrane formed in step C) (until it is self-supporting).

The aromatic and heteroaromatic tetraamino compounds used according to the invention are preferably 3,3',4,4'-tetraaminobiphenyl, 2,3,5,6-tetraaminopyridine, 1,2,4,5-tetraaminobenzene, bis(3,4-diaminophenyl)sulfone, bis(3,4-diaminophenyl)ether, 3,3',4,4'-tetraaminobenzophenone, 3,3',4,4'-tetraaminodiphenylmethane and 3,3',4,4'-tetraaminodiphenyldimethylmethane and also their salts, in particular their mono-, di-, tri- and tetrahydrochloride derivatives.

The aromatic carboxylic acids used according to the invention are dicarboxylic acids and tricarboxylic acids and tetracarboxylic acids or their esters or anhydrides or acid chlorides. The term aromatic carboxylic acids also encompasses heteroaromatic carboxylic acids. The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid; 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl)ether, benzophenone-4,4'-dicarboxylic acid, bis(4-cargoxyphenyl)sulfone, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid or their C1-C20-alkyl esters or C5-C12-aryl esters or their acid anhydrides or acid chlorides. The aromatic tricarboxylic or tetracarboxylic acids and their C1-C20-alkyl esters or C5-C12-aryl esters or their acid anhydrides or acid chlorides are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid, 3,5,4'-biphenyltricarboxylic acid.

The aromatic tetracarboxylic acids or their C1-C20-alkyl esters or C5-C12-aryl esters or their acid anhydrides or acid chlorides are preferably 3,5,3',5'-biphenyltetracarboxylic acid, 1,2,4,5-benzenetetracarboxylic acid, benzophenonetetracarboxylic acid, 3,3',4,4'-biphenyltetracarboxylic acid, 2,2',3,3-biphenyltetracarboxylic acid, 1,2,5,6-naphthalenetetracarboxylic acid, 1,4,5,8-naphthalenetetracarboxylic acid.

The heteroaromatic carboxylic acids used according to the invention are heteroaromatic dicarboxylic acids and tricarboxylic acids and tetracarboxylic acids or esters or anhydrides thereof. For the purposes of the present invention, heteroaromatic carboxylic acids are aromatic systems in which at least one nitrogen, oxygen, sulfur or phosphorus atom is present in the aromatic. Preference is given to pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also their C1-C20-alkyl esters or C5-C12-aryl esters or their acid anhydrides or acid chlorides.

The content of tricarboxylic acids or tetracarboxylic acids (based on dicarboxylic acid used) is from 0 to 30 mol %, preferably from 0.1 to 20 mol %, in particular from 0.5 to 10 mol %.

The aromatic and heteroaromatic diaminocarboxylic acids used according to the invention are preferably diaminobenzoic acid and its monohydrochloride and dihydrochloride derivatives.

In step A), preference is given to using mixtures of at least 2 different aromatic carboxylic acids. Particular preference is given to using mixtures comprising aromatic carboxylic acids together with heteroatomic carboxylic acids. The mixing ratio of aromatic carboxylic acids to heteroaromatic carboxylic acids is in the range from 1:99 to 99:1, preferably from 1:50 to 50:1.

In particular, these mixtures are mixtures of N-heteroaromatic dicarboxylic acids and aromatic dicarboxylic acids. Nonlimiting examples are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl)ether, benzophenone-4,4'-dicarboxylic acid, bis(4-carboxyphenyl)sulfone, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

The polyphosphoric acid used in step A) is a commercial polyphosphoric acid as is obtainable, for example, from Riedel-de Haen, The polyphosphoric acids $H_{n+2}P_nO_{3n+1}$ (n>1) usually have an assay calculated as $P_2O_5$ (acidimetric) of at least 83%. Instead of a solution of the monomers, it is also possible to produce a dispersion/suspension. The mixture produced in step A) has a weight ratio of polyphosphoric acid to the sum of all monomers of from 1:10000 to 10000:1, preferably from 1:1000 to 1000:1, in particular from 1:100 to 100:1.

Layer formation in step B) is carried out by means of known measures (casting, spraying, doctor blade coating) known from the prior art for polymer film production. As supports, it is possible to use all supports which are inert under the conditions employed. To adjust the viscosity, the solution can, if necessary, be admixed with phosphoric acid (concentrated phosphoric acid, 85%). In this way, the viscosity can be set to the desired value and the formation of the membrane can be made easier. The layer produced in step B) has a thickness of from 20 to 4000 μm, preferably from 30 to 3500 μm, in particular from 50 to 3000 μm.

The polyazole-based polymer formed in step C) comprises recurring azole units of the formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVI) and/or (XVII) and/or (XVIII) and/or (XIX) and/or (XX) and/or (XXI) and/or (XXII)

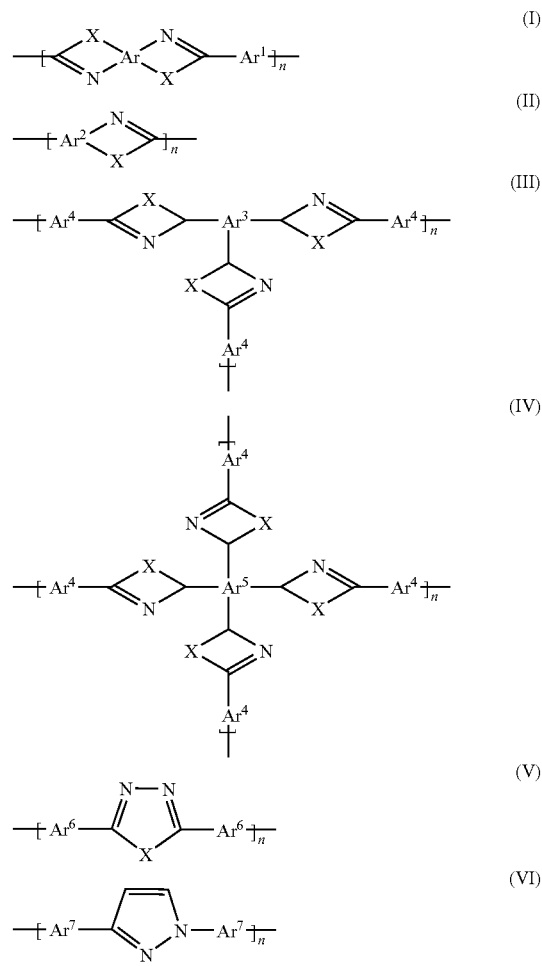

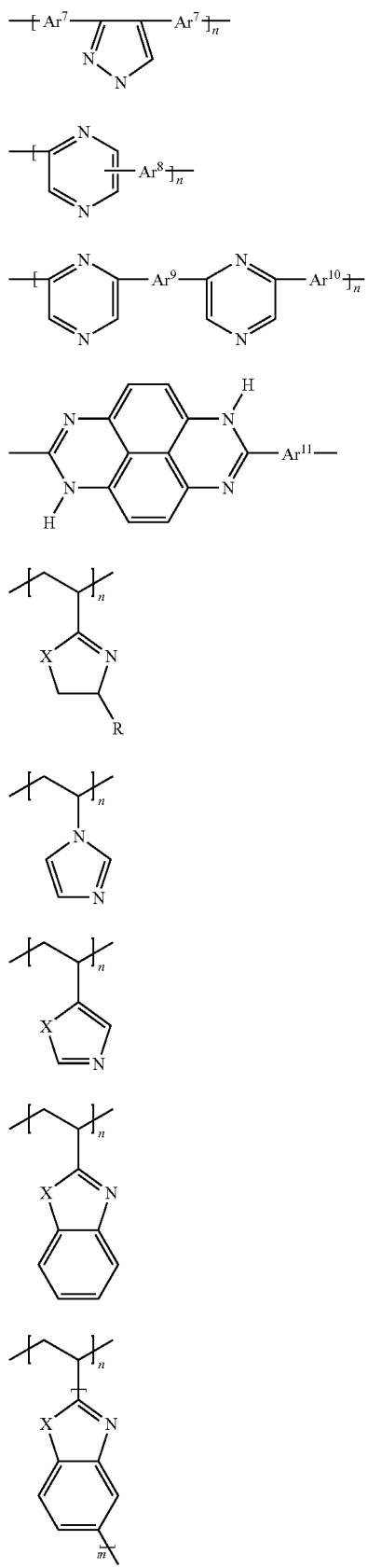

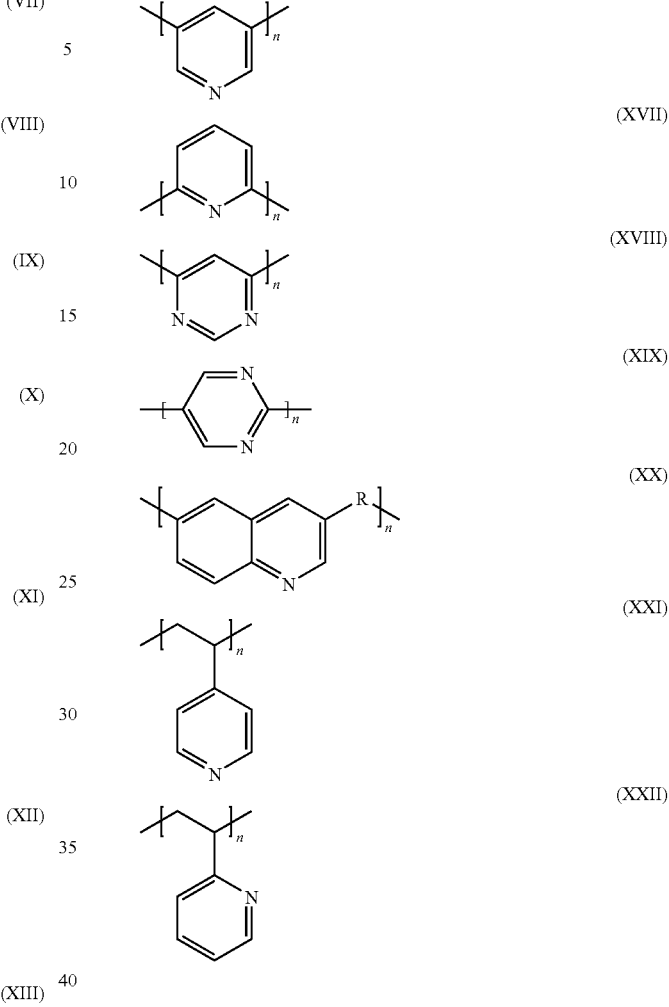

where

Ar are identical or different and are each a tetravalent aromatic or heteroaromatic group which may have one or more rings, $Ar^1$ are identical or different and are each a divalent aromatic or heteroaromatic group which may have one or more rings, $Ar^2$ are identical or different and are each a divalent or trivalent aromatic or heteroaromatic group which may have one or more rings, $Ar^3$ are identical or different and are each a trivalent aromatic or heteroaromatic group which may have one or more rings, $Ar^4$ are identical or different and are each a trivalent aromatic or heteroaromatic group which may have one or more rings, $Ar^5$ are identical or different and are each a tetravalent aromatic or heteroaromatic group which may have one or more rings, $Ar^6$ are identical or different and are each a divalent aromatic or heteroaromatic group which may have one or more rings, $Ar^7$ are identical or different and are each a divalent aromatic or heteroaromatic group which may have one or more rings, Ar⁸ are identical or different and are each a trivalent aromatic or heteroaromatic group which may have one or more rings, Ar⁹ are identical or different and are each a divalent or trivalent or tetravalent aromatic or heteroaromatic group which may have one or more rings, Ar¹⁰ are identical or different and are each a divalent or trivalent aromatic or heteroaromatic group which may have one or more rings, Ar¹¹ are identical or different and are each a divalent aromatic or heteroaromatic group which may have one or more rings, X are identical or different and are each oxygen, sulfur or an amino group bearing a hydrogen atom, a group having 1-20 carbon atoms, preferably a branched or unbranched alkyl or alkoxy group, or an aryl group as further radical, R are identical or different and are each hydrogen, an alkyl group or an aromatic group and n, m are each an integer greater than or equal to 10, preferably greater than or equal to 100.

Preferred aromatic or heteroaromatic groups are derived from benzene, naphthalene, biphenyl, diphenyl ether, diphenylmethane, diphenyldimethylmethane, bisphenone, diphenyl sulfone, quinoline, pyridine, bipyridine, pyridazine, pyrimidine, pyrazine, triazine, tetrazine, pyrrole, pyrazole, anthracene, benzopyrrole, benzotriazole, benzooxathiadiazole, benzooxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may also be substituted.

Ar¹, Ar⁴, Ar⁶, Ar⁷, Ar⁸, Ar⁹, Ar¹⁰, Ar¹¹ can have any substitution pattern; in the case of phenylene for example, Ar¹, Ar⁴, Ar⁶, Ar⁷, Ar⁸, Ar⁹, Ar¹⁰, Ar¹¹ can each be ortho-, meta- or para-phenylene. Particularly preferred groups are derived from benzene and biphenyls, which may also be substituted.

Preferred alkyl groups are short-chain alkyl groups having from 1 to 4 carbon atoms, e.g. methyl, ethyl, n-propyl or i-propyl and t-butyl groups.

Preferred aromatic groups are phenyl or naphthyl groups. The alkyl groups and the aromatic groups may be substituted.

Preferred substituents are halogen atoms such as fluorine, amino groups, hydroxy groups or short-chain alkyl groups such as methyl or ethyl groups.

Preference is given to polyazoles comprising recurring units of the formula (I) in which the radicals X are identical within a recurring unit.

The polyazoles can in principle also comprise different recurring units which differ, for example, in their radical X. However, they preferably have only identical radicals X in a recurring unit.

Further, preferred polyazole polymers are polyimidazoles, polybenzothiazoles, polybenzoxazoles, polyoxadiazoles, polyquinoxalines, polythiadiazoles, poly(pyridines), poly(pyrimidines), and poly(tetrazapyrenes).

In a further embodiment of the present invention, the polymer comprising recurring azole units is a copolymer or a blend comprising at least two units of the formulae (I) to (XXII) which differ from one another. The polymers can be present as block copolymers (diblock, triblock), random copolymers, periodic copolymers and/or alternating polymers.

In a particularly preferred embodiment of the present invention, the polymer comprising recurring azole units is a polyazole which contains only units of the formula (I) and/or (II).

The number of recurring azole units in the polymer is preferably greater than or equal to 10. Particularly preferred polymers have at least 100 recurring azole units.

For the purposes of the present invention, polymers comprising recurring benzimidazole units are preferred. Some examples of the extremely advantageous polymers comprising recurring benzimidazole units have the following formulae:

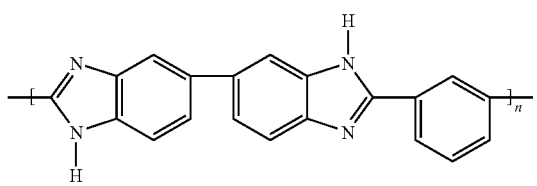 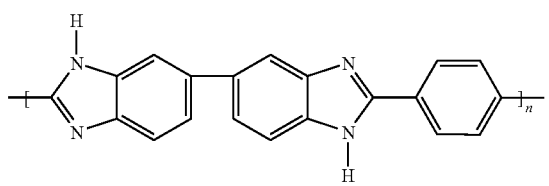

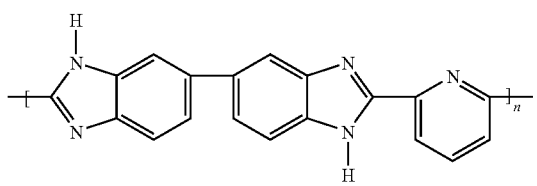 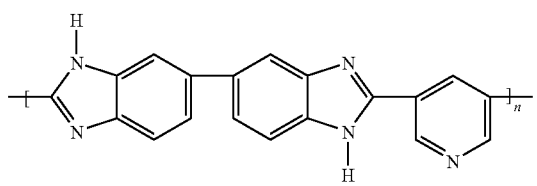

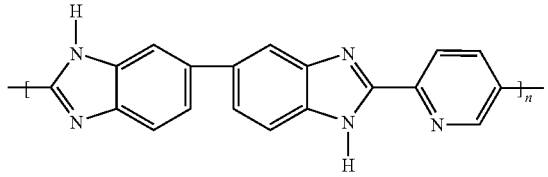 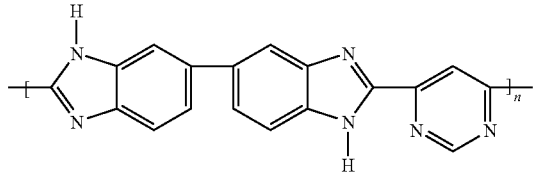

-continued
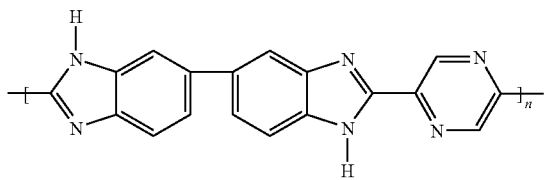 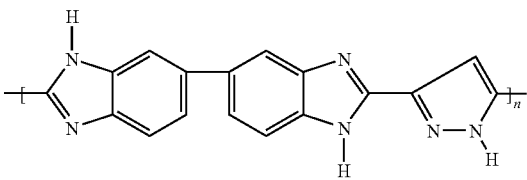
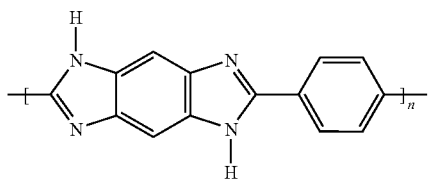 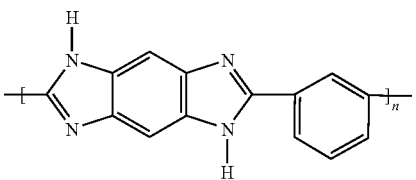
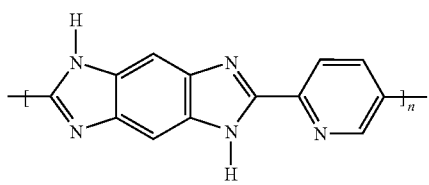 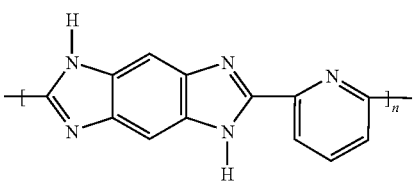
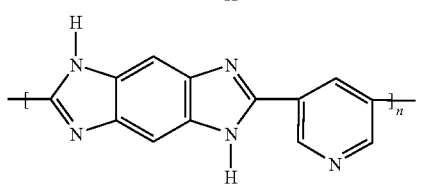 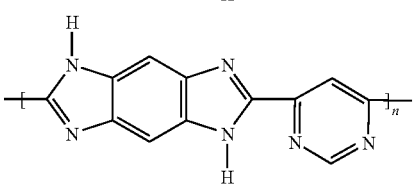
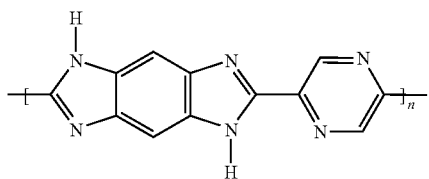 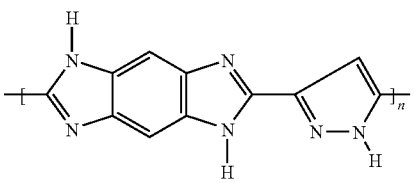
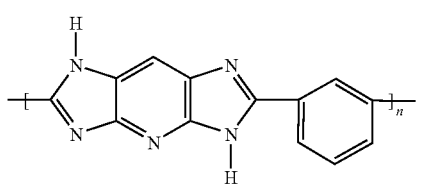 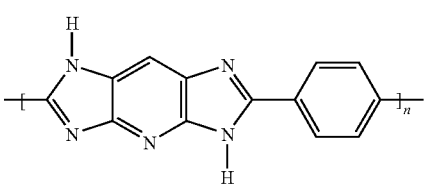
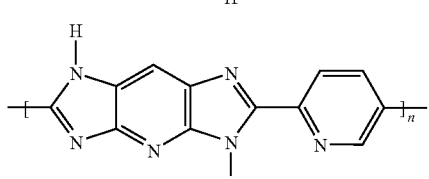 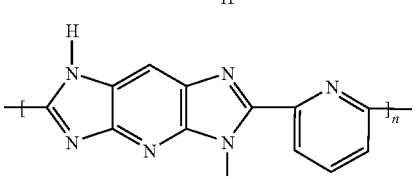
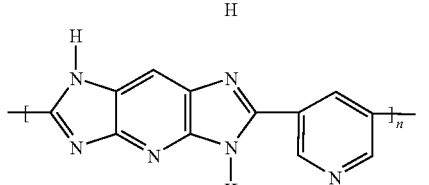 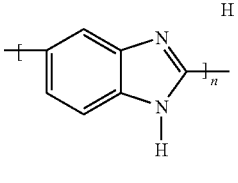
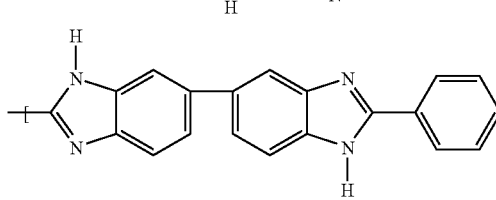 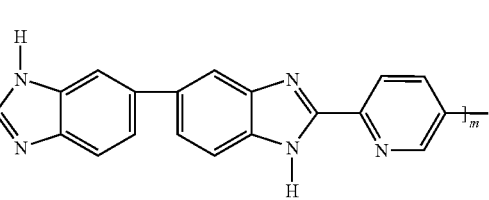

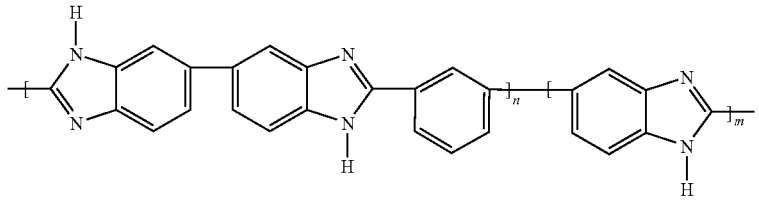

where n and m are each an integer greater than or equal to 10, preferably greater than or equal to 100.

The polyazoles obtainable by means of the process described, in particular the polybenzimidazoles, have a high molecular weight. Measured as intrinsic viscosity, this is at least 1.4 dl/g and is thus significantly above that of commercial polybenzimidazole (IV<1.1 dl/g).

If the mixture obtained in step A) comprises tricarboxylic acids or tetracarboxylic acids, branching/crosslinking of the polymer formed is achieved in this way. This contributes to an improvement in the mechanical properties.

The polymer layer produced in step C) is treated at elevated temperatures in the presence of moisture for a time which is sufficient for the layer to become sufficiently strong for use in fuel cells. The treatment can be carried out until the membrane is self-supporting, so that it can be detached from the support without damage.

In one variant of the process, the formation of oligomers and/or polymers can be effected by heating the mixture from step A) to temperatures of up to 350° C., preferably up to 280° C. Depending on the temperature and time chosen, the heat treatment in step C) can subsequently be partly or entirely dispensed with. This variant is also subject matter of the present invention.

Furthermore, it has been found that when aromatic dicarboxylic acids (or heteroaromatic dicarboxylic acids) such as isophthalic acid, terephthalic acid, 2,5-dihydroxyterephthalic acid, 4,6-dihydroxyisophthalic acid, 2,6-dihydroxyisophthalic acid, diphenic acid, 1,8-dihydroxynaphthalene-3,6-dicarboxylic acid, bis(4,-carboxyphenyl)ether, benzophenone-4,4'-dicarboxylic acid, bis(4-carboxyphenyl)sulfone, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid or 2,5-pyrazinedicarboxylic acid are used, a temperature in step C), or in step A) if the formation of oligomers and/or polymers in this step is desired, in the range up to 300° C., preferably from 100° C. to 250° C., is advantageous.

The treatment of the membrane in step D) is carried out at temperatures above 0° C. and less than 150° C., preferably at temperatures of from 10° C. to 120° C., in particular from room temperature (20° C.) to 90° C., in the presence of moisture or water and/or water vapor and/or water-containing phosphoric acid having a concentration of up to 85%. The treatment is preferably carried out at atmospheric pressure, but can also be carried out at superatmospheric pressure. It is important for the treatment to occur in the presence of sufficient moisture so that the polyphosphoric acid present contributes to strengthening of the membrane as a result of partial hydrolysis to form low molecular weight polyphosphoric acid and/or phosphoric acid.

The partial hydrolysis of the polyphosphoric acid in step D) leads to strengthening of the membrane and to a decrease in the thickness and formation of a membrane having a thickness of from 15 to 3000 µm, preferably from 20 to 2000 µm, in particular from 20 to 1500 µm, which is self-supporting.

The intramolecular and intermolecular structures (interpenetrating networks, IPNs) present in the polyphosphoric acid layer obtained in step B) lead, in step C), to ordered membrane formation which is responsible for the particular properties of the membrane formed.

The upper temperature limit for the treatment in step D) is generally 150° C. If moisture is present for an extremely short time, for example in the case of superheated steam, this steam can also be hotter than 150° C. The important factor in determining the upper temperature limit is the duration of the treatment.

The partial hydrolysis (step D) can also be carried out in temperature- and humidity-controlled chambers so that the hydrolysis can be controlled in a targeted manner in the presence of a defined amount of moisture. The amount of moisture can in this case be set in a targeted manner by means of the temperature or saturation of the environment in contact with the membrane, for example gases such as air, nitrogen, carbon dioxide or other suitable gases, or steam. The treatment time is dependent on the above parameters chosen.

Furthermore, the treatment time is dependent on the thickness of the membrane.

The treatment time is generally in the range from a few seconds to some minutes, for example under the action of superheated steam, or up to a number of days, for example in air at room temperature and a low relative atmospheric humidity. The treatment time is preferably from 10 seconds to 300 hours, in particular from 1 minute to 200 hours.

If the partial hydrolysis is carried out at room temperature (20° C.) using ambient air having a relative atmospheric humidity of 40-80%, the treatment time is from 1 to 200 hours.

The membrane obtained in step D) can be made self-supporting, i.e. it can be detached from the support without damage and subsequently be processed further immediately if desired.

The concentration of phosphoric acid and thus the conductivity of the polymer membrane according to the invention can be set via the degree of hydrolysis, i.e. the time, temperature and ambient moisture level. According to the invention, the concentration of phosphoric acid is reported as mole of acid per mole of repeating units of the polymer. For the purposes of the present invention, a concentration (mole of phosphoric acid per repeating unit of the formula (III), i.e. polybenzimidazole) of from 10 to 50, in particular from 12 to 40, is preferred. Such high degrees of doping (concentrations) are very difficult or impossible to achieve by doping polyazoles with commercially available ortho-phosphoric acid.

Subsequent to the treatment as described in step D), the membrane can be crosslinked on the surface by action of heat in the presence of atmospheric oxygen. This hardening of the membrane surface effects an additional improvement in the properties of the membrane.

Crosslinking can also be achieved by action of IR or NIR (IR=infrared, i.e. light having a wavelength of more than 700 nm; NIR=near IR, i.e. light having a wavelength in the range from about 700 to 2000 nm or an energy in the range from about 0.6 to 1.75 eV). A further method is irradiation with β-rays The radiation dose is in this case in the range from 5 to 200 kGy.

The polymer membrane of the invention has improved materials properties compared to the doped polymer membranes known hitherto. In particular, it displays improved performance compared to known doped polymer membranes. This is due, in particular, to an improved proton conductivity. This is at least 0.1 S/cm, preferably at least 0.11 S/cm, in particular at least 0.12 S/cm, at a temperature of 120° C.

To achieve a further improvement in the use properties, fillers, in particular proton-conducting fillers, and also additional acids can be additionally added to the membrane. The addition can be carried out either during step A or after the polymerization.

Nonlimiting examples of proton-conducting fillers are

Sulfates such as $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, Phosphates such as $Zr_3(PO_4)_4$, $Zr(HPO_4)_2$, $HZr_2(PO_4)_3$, $UO_2PO_4.3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, Polyacids such as $H_3PW_{12}O_{40}.nH_2O$ (n=21-29), $H_3SiW_{12}O_{40}.nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$ Selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, Oxides such as $Al_2O_3$, $Sb_2O_5$, $ThO_2$, $SnO_2$, $ZrO_2$, $MoO_3$ Silicates such as zeolites, zeolites($NH_4$+), sheet silicates, network silicates, H-natrolites, H-mordenites, $NH_4$-analcines, $NH_4$-sodalites, $NH_4$-gallates, H-montmorillonites Acids such as $HClO_4$, $SbF_5$ Fillers such as carbides, in particular SiC, $Si_3N_4$, fibers, in particular glass fibers, glass powders and/or polymer fibers, preferably those based on polyazoles.

This membrane can also further comprise perfluorinated sulfonic acid additives (0.1-20% by weight, preferably 0.2-15% by weight, very particularly preferably 0.2-10% by weight). These additives lead to a performance improvement, in the vicinity of the cathode to an increase in the oxygen solubility and oxygen diffusion and to a decrease in the adsorption of phosphoric acid and phosphate on platinum. (Electrolyte additives for phosphoric acid fuel cells. Gang, Xiao; Hjuler, H. A.; Olsen, C.; Berg, R. W.; Bjerrum, N. J. Chem. Dep. A, Tech. Univ. Denmark, Lyngby, Den. J. Electrochem. Soc. (1993), 140(4), 896-902, and perfluorosulfonimide as an additive in phosphoric acid fuel cell. Razaq, M.; Razaq, A.; Yeager, E.; DesMarteau, Darryl D.; Singh, S. Case Cent. Electrochem. Sci., Case West. Reserve Univ., Cleveland, Ohio, USA. J. Electrochem. Soc. (1989), 136(2), 385-90.)

Nonlimiting examples of persulfonated additives are:

Trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexanesulfonate, lithium perfluorohexanesulfonate, ammonium perfluorohexanesulfonate, perfluorohexanesulfonic acid, potassium nonafluorobutanesulfonate, sodium nonafluorobutanesulfonate, lithium nonafluorobutanesulfonate, ammonium nonafluorobutanesulfonate, cesium nonafluorobutanesulfonate, triethylammonium perfluorohexanesulfonate, perfluorosulfonimides and Nafion.

Furthermore, the membrane can further comprise additives which scavenge (primary antioxidants) or destroy (secondary antioxidants) the peroxide radicals generated by reduction of oxygen in operation and thereby increase the life and stability of the membrane and membrane electrode unit, as described in JP2001118591 A2. The molecular structures of such additives and the way in which they function are described in F. Gugumus in Plastics Additives, Hanser Verlag, 1990; N. S. Allen, M. Edge Fundamentals of Polymer Degradation and Stability, Elsevier, 1992; or H. Zweifel, Stabilization of Polymeric Materials, Springer, 1998.

Nonlimiting examples of such additives are:

bis(trifluoromethyl)nitroxide, 2,2-diphenyl-1-picrinylhydrazyl, phenols, alkylphenols, sterically hindered alkylphenols such as Irganox, aromatic amines, sterically hindered amines such as Chimassorb; sterically hindered hydroxylamines, sterically hindered alkylamines, sterically hindered hydroxylamines, sterically hindered hydroxylamine ethers, phosphites such as Irgafos, nitrosobenzene, methyl-2-nitrosopropane, benzophenone, benzaldehyde tert-butylnitrone, cysteamine, melamines, lead oxides, manganese oxides, nickel oxides, cobalt oxides.

The possible fields of use of the doped polymer membranes according to the invention include, inter alia, use in fuel cells, in electrolysis, in capacitors and in battery systems. Owing to their property profile, the doped polymer membranes are preferably used in fuel cells.

The present invention also relates to a membrane-electrode unit comprising at least one polymer membrane according to the invention. For further information on membrane-electrode units, reference may be made to the specialist literature, in particular the patents U.S. Pat. Nos. 4,191,618, 4,212,714 and 4,333,805. The disclosure in the abovementioned references [U.S. Pat. Nos. 4,191,618, 4,212,714 and 4,333,805] regarding the structure and production of membrane-electrode units and the electrodes, gas diffusion layers and catalysts to be chosen is hereby incorporated by reference into the present description.

In one variant of the present invention, the membrane can be formed directly on the electrode rather than on a support. The treatment in step D) can be shortened in this way, since the membrane no longer has to be self-supporting. Such a membrane is also subject matter of the present invention.

The present invention further provides an electrode provided with a proton-conducting polymer coating based on polyazoles which is obtainable by a process comprising the steps A) Mixing of one or more aromatic tetraamino compounds with one or more aromatic carboxylic acids or esters thereof which contain at least two acid groups per carboxylic acid monomer, or mixing of one or more aromatic and/or heteroaromatic diaminocarboxylic acids, in polyphosphoric acid to form a solution and/or dispersion, B) Application of a layer to an electrode using the mixture from step A), C) Heating of the flat structure/layer obtainable as described in step B) to temperatures of up to 350° C., preferably up to 280° C., under inert gas to form the polyazole polymer, D) Treatment of the membrane formed in step C).

The polymerization/formation of oligomers can also be effected in step A) and the solution can be applied to the electrode by blade coating. Step C) can then be partly or entirely dispensed with.

The above-described variants and preferred embodiments also apply to this subject matter, so that repetition of these will be dispensed with at this point.

The coating after step D) has a thickness of from 2 to 3000 μm, preferably from 3 to 2000 μm, in particular from 5 to 1500 μm.

An electrode which has been coated in this way can be incorporated in a membrane-electrode unit which may, if desired, comprise at least one polymer membrane according to the invention.

General Measurement Methods:

Method of Measuring the IEC

The conductivity of the membrane is dependent to a high degree on the content of acid groups expressed by the ion exchange capacity (IEC). To measure the ion exchange capacity, a specimen having a diameter of 3 cm is stamped out and placed in a glass beaker filled with 100 ml of water. The acid liberated is titrated with 0.1 M NaOH. The specimen is subsequently taken out, excess water is dabbed off and the specimen is dried at 160° C. for 4 hours. The dry weight, $m_0$, is then determined gravimetrically to a precision of 0.1 mg. The ion exchange capacity is then calculated from the consumption of 0.1M NaOH to the first titration end point, $V_1$ in ml, and the dry weight, $m_0$ in mg, according to the following formula:

$$IEC=V_1*300/m_0$$

Method of Measuring the Specific Conductivity

The specific conductivity is measured by means of impedance spectroscopy in a 4-pole arrangement in the potentiostatic mode using platinum electrodes (wire, 0.25 mm diameter). The distance between the current-collecting electrodes is 2 cm. The spectrum obtained is evaluated using a simple model consisting of a parallel arrangement of an ohmic resistance and a capacitor. The specimen cross section of the membrane doped with phosphoric acid is measured immediately before installation of the specimen. To measure the temperature dependence, the measurement cell is brought to the desired temperature in an oven and the temperature is regulated via a Pt-100 resistance thermometer positioned in the immediate vicinity of the specimen. After the desired temperature has been reached, the specimen is held at this temperature for 10 minutes before commencement of the measurement.

EXAMPLES

Example 1

Poly(2,2'-(m-phenylene)-5,5'-bibenzimidazole (PBI) Membrane 525.95 g of PPA were added to a mixture of 32.338 g of isophthalic acid (0.195 mol) and 41.687 g of 3,3',4,4'-tetraaminobiphenyl (0.195 mol) in a three-necked flask provided with a mechanical stirrer and $N_2$ inlet and outlet. The mixture was firstly heated at 120° C. for 2 hours, then at 150° C. for 3 hours, then at 180° C. for 2 hours and subsequently at 220° C. for 16 hours while stirring. 200 g of 85% strength phosphoric acid were then added to this solution at 220° C. The resulting solution was stirred at 220° C. for 2 hours and the temperature was finally increased to 240° C. for 1 hour. The highly viscous solution was applied at this temperature to a glass plate by means of a preheated doctor blade coating apparatus. A transparent, dark brown poly(2,2'-(m-phenylene)-5,5'-bibenzimidazole (PBI) membrane was obtained. The membrane was subsequently allowed to stand at RT for 1 hour to obtain a self-supporting membrane.

A small part of the solution was precipitated with water. The precipitated resin was filtered, washed three times with $H_2O$, neutralized with ammonium hydroxide, then washed with $H_2O$ and dried at 100° C. and 0.001 bar for 24 hours. The intrinsic viscosity $\eta_{int}$ was measured on a 0.2 g/dl PBI solution in 100 ml of 96% strength $H_2SO_4$, giving a value of $\eta_{int}$=1.8 dl/g at 30° C.

Example 2

Poly(2,2'-(m-phenylene)-5,5'-bibenzimidazole (PBI) Membrane 525.95 g of PPA were added to a mixture of 32.338 g of isophthalic acid (0.195 mol) and 41.687 g of 3,3',4,4'-tetraaminobiphenyl (0.195 mol) in a three-necked flask provided with a mechanical stirrer and $N_2$ inlet and outlet. The mixture was firstly heated at 120° C. for 2 hours, then at 150° C. for 3 hours, then at 180° C. for 2 hours and subsequently at 220° C. for 16 hours while stirring. 200 g of 85% strength phosphoric acid were then added to this solution at 220° C. The resulting solution was stirred at 220° C. for 2 hours and the temperature was finally increased to 240° C. for 6 hours. The highly viscous solution was applied at this temperature to a glass plate by means of a preheated doctor blade coating apparatus. A transparent, dark brown poly(2,2'-(m-phenylene)-5,5'-bibenzimidazole (PBI) membrane was obtained. The membrane was subsequently allowed to stand at RT for 1 hour to obtain a self-supporting membrane.

A small part of the solution was precipitated with water. The precipitated resin was filtered, washed three times with $H_2O$, neutralized with ammonium hydroxide, then washed with $H_2O$ and dried at 100° C. and 0.001 bar for 24 hours. The intrinsic viscosity $\eta_{int}$ was measured on a 0.2 g/dl PBI solution in 100 ml of 96% strength $H_2SO_4$, giving a value of $\eta_{int}$=2.2 dl/g at 30° C.

Example 3

Poly((6-6'-bibenzimidazole-2,2'-diyl)-2,5-pyridine)-membrane 3.34 g (20 mmol) of 2,5-pyridinedicarboxylic acid, 4.26 g (20 mmol) of 3,3',4,4'-tetraaminobiphenyl and 60 g of polyphosphoric acid were placed in a three-necked flask provided with a mechanical stirrer and $N_2$ inlet and outlet. The reaction solution was stirred at 180° C. for 20 hours. The temperature was subsequently increased to 240° C. and the mixture was stirred for a further 4 hours. The reaction solution was then diluted at 240° C. with 10 ml of $H_3PO_4$ and stirred for 1 hour. The highly viscous solution was applied at this temperature to a preheated glass plate by means of a preheated doctor blade coating apparatus. A transparent, orange 2,5-pyridine-PBI membrane was obtained. The membrane was subsequently allowed to stand at RT for 1 day to obtain a self-supporting membrane.

A small part of the solution was precipitated with water. The precipitated resin was filtered, washed three times with $H_2O$, neutralized with ammonium hydroxide, then washed

Example 4

Poly(2,2'-(1H-pyrazole)-5,5'-bibenzimidazole Membrane 2.104 g ($9.82 \cdot 10^{-3}$ mol) of 3,3'-4,4'-tetraminobiphenyl, 1.7094 g ($9.82 \cdot 10^{-3}$ mol) of 1H-pyrazole-3,5-dicarboxylic acid and 41.4 g of polyphosphoric acid were placed in a three-necked flask provided with a mechanical stirrer and $N_2$ inlet and outlet. The reaction solution was stirred at 100° C. for 1 hour, at 150° C. for 1 hour, at 180° C. for 6 hours and at 220° C. for 8 hours. The temperature was subsequently lowered to 200° C. The highly viscous solution was applied at this temperature to a preheated glass plate by means of a preheated doctor blade coating apparatus. A transparent, orange 2,5-pyridine-PBI membrane was obtained. The membrane was subsequently allowed to stand at RT for 3 days.

A small part of the solution was precipitated with water. The precipitated resin was filtered, washed three times with $H_2O$, neutralized with ammonium hydroxide, then washed with $H_2O$ and dried at 100° C. and 0.001 bar for 24 hours. The intrinsic viscosity $\eta_{int}$ was measured on a 0.2 g/dl PBI solution in 100 ml of 96% strength $H_2SO_4$, giving a value of $\eta_{int}$=1.9 dl/g at 30° C.

Example 5:

Poly(2,2'-(p-phenylene)-5,5'-bibenzimidazole-co-poly((6-6'-bibenzimidazole-2,2'-diyl)-2,5-pyridine) Membrane 5.283 g of 2,5-pyridinedicarboxylic acid (125 mmol), 15.575 g of terephthalic acid (375 mmol), 26.785 g of TAB (0.5 mol) and 468 g of PPA were placed in a 500 ml three-necked flask. The reaction suspension was heated at 150° C. for 2 hours, then at 190° C. for 4 hours and then at 220° C. for 16 hours. The reaction solution was then diluted at 220° C. with 600 g of 85% strength $H_3PO_4$ and subsequently stirred at 240° C. for 6 hours.

The highly viscous solution was applied at this temperature to a glass plate by means of a preheated doctor blade coating apparatus. A transparent, dark brown 2,5-pyridine-PBI-co-para-PBI membrane was obtained. The membrane was subsequently allowed to stand at RT for 1 day.

A small part of the solution was precipitated with water. The precipitated resin was filtered, washed three times with $H_2O$, neutralized with ammonium hydroxide, then washed with $H_2O$ and dried at 100° C. and 0.001 bar for 24 hours. The intrinsic viscosity $\eta_{int}$ was measured on a 0.2 g/dl polymer solution in 100 ml of 96% strength $H_2SO_4$, giving a value of $\eta_{int}$=2.6 dl/g at 30° C.

Example 6

AB-co-AABB-PBI Membrane 802 g of PPA were added to a mixture of 32.338 g of isophthalic acid (0.195 mol), 41.687 g of 3,3',4,4'-tetraaminobiphenyl (0.195 mol) and 29.669 g of diaminobenzoic acid (0.0195 mol) in a three-necked flask provided with a mechanical stirrer and $N_2$ inlet and outlet. The mixture was firstly heated at 120° C. for 2 hours, then at 150° C. for 3 hours, then at 180° C. for 2 hours and subsequently at 220° C. for 16 hours while stirring. 200 g of 85% strength phosphoric acid were then added to this solution at 220° C. The resulting solution was stirred at 220° C. for 4 hours and the temperature was finally increased to 240° C. for 6 hours. The highly viscous solution was applied at this temperature to a glass plate by means of a preheated doctor blade coating apparatus. A transparent, dark brown poly(2,2'-(m-phenylene)-5,5'-bibenzimidazole-co-polybenzimidazole membrane was obtained. The membrane was subsequently allowed to stand at RT for 5 hours to obtain a self-supporting membrane. A small part of the solution was precipitated with water. The precipitated resin was filtered, washed three times with $H_2O$, neutralized with ammonium hydroxide, then washed with $H_2O$ and dried at 100° C. and 0.001 bar for 24 hours. The intrinsic viscosity $\eta_{int}$ was measured on a 0.2 g/dl polymer solution in 100 ml of 96% strength $H_2SO_4$, giving a value of $\eta_{int}$=2.1 dl/g at 30° C.

Example 7

Poly(2,2'-(p-phenylene)-5,5'-bibenzimidazole-co-poly(2,2'-(1H-pyrazole)-5,5'-bibenzimidazole Membrane 3.037 g (0.0142 mol) of 3,3'-4,4'-tetraminobiphenyl, 2.119 g (0.0128 mol) of isophthalic acid, 0.2467 ($1.42 \cdot 10^{-3}$ mol) of 1H-pyrazole-3,5-dicarboxylic acid and 43.8 g of polyphosphoric acid were placed in a three-necked flask provided with a mechanical stirrer and $N_2$ inlet and outlet. The reaction solution was stirred at 100° C. for 1 hour, at 150° C. for 1 hour, at 180° C. for 6 hours and at 220° C. for 8 hours. The temperature was subsequently lowered to 200° C. The highly viscous solution was applied at this temperature to a preheated glass plate by means of a preheated doctor blade coating apparatus. A transparent, orange 2,5-pyridine-PBI membrane was obtained. The membrane was subsequently allowed to stand at RT for 3 days to obtain a self-supporting membrane (254 µm).

A small part of the solution was precipitated with water. The precipitated resin was filtered, washed three times with $H_2O$, neutralized with ammonium hydroxide, then washed with $H_2O$ and dried at 100° C. and 0.001 bar for 24 hours. The intrinsic viscosity $\eta_{int}$ was measured on a 0.2 g/dl polymer solution in 100 ml of 96% strength $H_2SO_4$, giving a value of $\eta_{int}$=1.8 dl/g at 30° C.

Example 8

PBI-Zr(HPO$_4$)$_2$ Membrane In Situ 3.208 g (0.015 mol) of 3,3'-4,4'-tetraminobiphenyl, 2.487 g (0.015 mol) of isophthalic acid, 0.462 g of zirconium hydrogen phosphate and 64.8 g of polyphosphoric acid were placed in a three-necked flask provided with a mechanical stirrer and $N_2$ inlet and outlet. The reaction solution was stirred at 100° C. for 1 hour, at 150° C. for 1 hour, at 180° C. for 6 hours and at 220° C. for 8 hours. The temperature was subsequently lowered to 200° C. The highly viscous solution was applied at this temperature to a preheated glass plate by means of a preheated doctor blade coating apparatus. A transparent, orange 2,5-pyridine-PBI membrane was obtained. The membrane was subsequently allowed to stand at RT for 3 days to obtain a self-supporting membrane.

Example 9

(SiC/PBI (10/10) Membrane) In Situ 93.86 g of polyphosphoric acid (83.4±0.5% of $P_2O_5$) were added to a mixture of 2.6948 g of isophthalic acid, 5 g of SiC (~400 mesh) and 3.474 g of 3,3',4,4'-tetraaminobiphenyl in a 100 ml flask provided with nitrogen inlet and outlet and a mechanical stirrer. This mixture was heated to 120° C. and stirred for 2 hours. The temperature was increased to 150° C. for 3 hours, then to 180° C. for 2 hours and finally to 220° C. for 18 hours. 11.09 g of 85% strength phosphoric acid were added to the resulting PBI solution in PPA over a period of 30 minutes and the solution was stirred at 220° C. for a further 0.5 hours. The resulting SiC-PBI(50/50) solution in 11% strength PPA was applied at 220° C. to a glass plate by means of a preheated doctor blade coating apparatus (381 µm). The membrane was cooled to RT and allowed to stand at RT for 1 day.

5% Strength PBI Stock Solution in 113.6% PPA for the Production of SiC/PBI Membranes 938.6 g of polyphosphoric acid (83.4±0.5% of $P_2O_5$) were added to a mixture of 26.948 g of isophthalic acid and 34.74 g of 3,3',4,4'-tetraaminobiphenyl in a 1.5 l flask provided with nitrogen inlet and outlet and a mechanical stirrer. This mixture was heated to 120° C. and stirred at 120° C. for 2 hours and at 150° C. for 3 hours. The temperature was increased to 180° C. for 2 hours. The reaction solution was then stirred at 220° C. for 18 hours. The resulting 5% strength PBI solution in PPA was cooled to RT and used for producing the following SiC/PBI membranes.

A small part of the solution was precipitated with water. The precipitated resin was filtered, washed three times with $H_2O$, neutralized with ammonium hydroxide, then washed with $H_2O$ and dried at 100° C. and 0.001 bar for 16 hours. The intrinsic viscosity $\eta_{int}$ was measured on a 0.4% strength PBI solution in 100 ml of 96% strength $H_2SO_4$, giving a value of 1.56 dl/g.

Example 10

(SiC/PBI (10/10) Membrane) Addition of SiC After the Polymerization 5 g of SiC (~400 mesh) were added to 100 g of 5% strength PBI stock solution in 113.6% PPA. The mixture was stirred at 220° C. for 3 hours. After addition of 11 g of 85% strength $H_3PO_4$, the resulting mixture was stirred for another 30 minutes. The 10/10 mixture of SiC/PBI in 110% strength PPA was applied at 220° C. to a glass plate by means of a preheated doctor blade coating apparatus. The membrane was cooled to RT and allowed to stand at RT for 1 day.

Example 11

($\alpha$-$Si_3N_4$/PBI (30/10) Membrane) Addition of $\alpha$-$Si_3N_4$ After the Polymerization 13.75 g $\alpha$-$Si_3N_4$ (~325 Mesh) were added to 100 g of 5% strength PBI stock solution in 113.6% PPA. The mixture was stirred at 220° C. for 3 hours. The 30/10 mixture of $\alpha$-$Si_3N_4$/PBI in 110% strength PPA was applied at 220° C. to a glass plate by means of a preheated doctor blade coating apparatus. The membrane was cooled to RT and allowed to stand at RT for 1 day.

Example 12

($Zr(HPO_4)_2$/PBI (3/97) Membrane) Addition of $Zr(HPO_4)_2$ After the Polymerization 25 g of $Zr(HPO_4)_2$ were added to 100 g of 5% strength PBI stock solution in 113.6% PPA. The mixture was stirred at 220° C. for 3 hours. The 3/97 mixture of $Zr(HPO_4)_2$/PBI in 110% strength PPA was applied at 220° C. to a glass plate by means of a preheated doctor blade coating apparatus. The membrane was cooled to RT and allowed to stand at RT for 1 day.

Example 13

Poly(2,2'-(m-phenylene)-5,5'-bibenzimidazole (PBI) Membrane 525.95 g of PPA were added to a mixture of 64.676 g of isophthalic acid (0.39 mol) and 83.374 g of 3,3',4,4'-tetraaminobiphenyl (0.39 mol) in a three-necked flask provided with a mechanical stirrer and $N_2$ inlet and outlet. The mixture was heated firstly at 120° C. for 2 hours and then at 150° C. for 3 hours while stirring. The resulting mixture was applied at this temperature to a glass plate by means of a preheated doctor blade coating apparatus. The glass plate was then heated in an oven under an $N_2$ atmosphere, firstly at 180° C. for 4 hours, then at 220° C. for 18 hours and then at 240° C. It was then cooled to RT and a dark brown poly(2,2'-(m-phenylene)-5,5'-bibenzimidazole (PBI) membrane was obtained. The membrane was subsequently allowed to stand at RT for 16 hours to obtain a self-supporting membrane.

Example 14

Poly(2,2'-(m-phenylene)-5,5'-bibenzimidazole (PBI) Membrane 525.95 g of PPA were added to a mixture of 97.014 g of isophthalic acid (0.585 mol) and 125.061 g of 3,3',4,4'-tetraaminobiphenyl (0.585 mol) a three-necked flask provided with a mechanical stirrer and $N_2$ inlet and outlet. The mixture was mixed at RT by stirring. The resulting mixture was applied at RT to a glass plate by means of a doctor blade. The glass plate was then heated in an oven under an $N_2$ atmosphere, firstly at 120° C. for 1 hour, then at 150° C. for 3 hours, then at 180° C. for 4 hours, then at 220° C. for 18 hours and then at 240° C. It was then cooled to RT and a dark brown poly(2,2'-(m-phenylene)-5,5'-bibenzimidazole (PBI) membrane was obtained. The membrane was subsequently allowed to stand at RT for 20 hours to obtain a self-supporting membrane.

Example 15

Poly(2,2'-(p-phenylene)-5,5'-bibenzimidazole-co-poly((6-6'-bibenzimidazole-2,2'-diyl)-2,5-pyridine) Membrane 5.283 g of 2,5-pyridinedicarboxylic acid (125 mmol), 15.575 g of terephthalic acid (375 mmol), 26.785 g of TAB (0.5 mol) and 468 g of PPA were placed in a 500 ml three-necked flask. The reaction suspension was heated at 120° C. for 2 hours, then at 150° C. for 4 hours, then at 190° C. for 6 hours and then at 220° C. for 20° C. The reaction solution was then diluted at 220° C. with 600 g of 85% strength $H_3PO_4$ and subsequently stirred at 240° C. for 6 hours.

The highly viscous solution was applied at this temperature to a filter paper moistened with water by means of a preheated doctor blade coating apparatus and the surface of the membrane was then sprayed with a water spray gun. A transparent, dark brown 2,5-pyridine-PBI-co-para-PBI membrane was obtained. The membrane was subsequently allowed to stand at RT for 2 hours.

A small part of the solution was precipitated with water. The precipitated resin was filtered, washed three times with $H_2O$, neutralized with ammonium hydroxide, then washed with $H_2O$ and dried at 100° C. and 0.001 bar for 24 hours. The intrinsic viscosity $\eta_{int}$ was measured on a 0.2 g/dl polymer solution in 100 ml of 96% strength $H_2SO_4$, giving a value of $\eta_{int}$=2.8 dl/g at 30° C.

Example 16

Poly(2,2'-(p-phenylene)-5,5'-bibenzimidazole-co-poly((6-6'-bibenzimidazole-2,2'-diyl)-2,5-pyridine) Membrane 5.283 g of 2,5-pyridinedicarboxylic acid (125 mmol), 15.575 g of terephthalic acid (375 mmol), 26.785 g of TAB (0.5 mol) and 468 g of PPA were placed in a 500 ml three-necked flask. The reaction suspension was heated at 120° C. for 3 hours, then at 150° C. for 3 hours, then at 190° C. for 4 hours and then at 220° C. for 15° C. The reaction solution was then diluted at 220° C. with 600 g of 85% strength $H_3PO_4$ and subsequently stirred at 240° C. for 4 hours. The highly viscous solution was applied at this temperature to a glass fiber nonwoven impregnated with water by means of a preheated doctor blade coating apparatus and the surface of the membrane was then sprayed with a water spray gun. A transparent, dark brown 2,5-pyridine-PBI-co-para-PBI membrane was obtained. The membrane was subsequently allowed to stand at RT for 5 hours.

A small part of the solution was precipitated with water. The precipitated resin was filtered, washed three times with $H_2O$, neutralized with ammonium hydroxide, then washed with $H_2O$ and dried at 100° C. and 0.001 bar for 24 hours. The intrinsic viscosity $\eta_{int}$ was measured on a 0.2 g/dl polymer solution in 100 ml of 96% strength $H_2SO_4$, giving a value of $\eta_{int}$=2.4 dl/g at 30° C.

TABLE

IEC and conductivity results

| Example | Thickness of the membrane [μm] | IEC [meq/g] | Conductivity @ 120° C. [mS/cm] |
|---|---|---|---|
| 1 | 280 | 139 | 120 |
| 2 | 340 | 166 | 130 |
| 3 | 156 | 190 | 122 |
| 4 | 220 | 126 | 117 |
| 5 | 300 | 340 | 180 |
| 6 | 250 | 130 | 120 |
| 7 | 281 | 121 | 116 |
| 8 | 300 | 178 | 160 |
| 9 | 247 | 124 | 130 |
| 10 | 322 | 151 | 121 |
| 11 | 330 | 79 | 112 |
| 12 | 314 | 168 | 150 |
| 13 | 140 | 118 | 110 |

TABLE-continued

IEC and conductivity results

| Example | Thickness of the membrane [μm] | IEC [meq/g] | Conductivity @ 120° C. [mS/cm] |
|---|---|---|---|
| 14 | 200 | 131 | 114 |
| 15 | 500 | 230 | 165 |
| 16 | 440 | 290 | 160 |

The invention claimed is:

1. An electrode provided with a proton-conducting polymer coating based on polyazoles which is obtained by a process comprising the steps
   (A) Mixing of one or more aromatic tetraamino compounds with one or more aromatic carboxylic acids or esters thereof which contain at least two acid groups per carboxylic acid monomer, or mixing of one or more aromatic and/or heteroaromatic diaminocarboxylic acids, in polyphosphoric acid to form a solution and/or dispersion,
   (B) Application of a layer to an electrode using the mixture from step A),
   (C) Heating of the flat structure/layer obtainable as described in step B) to temperatures of up to 350° C. under inert gas to form the polyazole polymer,
   (D) Treating the membrane formed in step C) by hydrolysis.

2. The electrode as claimed in claim 1, wherein the heating in step C is at a temperature of up to 280° C.

3. The electrode as claimed in claim 1, wherein the coating has a thickness of from 2 to 3000 μm.

4. The electrode as claimed in claim 1, wherein the coating has a thickness of from 3 to 2000 μm.

5. The electrode as claimed in claim 1, wherein the coating has a Thickness of from 5 to 1500 μm.

6. A membrane-electrode unit comprising at least one electrode as claimed in claim 1 and at least one membrane.

7. A fuel cell comprising one or more membrane-electrode units as claimed in claim 6.

8. A proton-conducting polymer membrane which comprises a polyazole and phosphoric acid and the membrane has a conductivity of at least 0.1 S/cm at a temperature of 120° C.

9. The membrane as claimed in claim 8, wherein the membrane has a conductivity of at least 0.11 S/cm at a temperature of 120° C.

10. The membrane as claimed in claim 8, wherein the membrane has a conductivity of at least 0.12 S/cm at a temperature of 120°9 C.

11. The membrane as claimed in claim 10, wherein said polyazole comprises recurring azole units of the formula (I) and/or (II) and/or (III) and/or (IV) and/or (V) and/or (VI) and/or (VII) and/or (VIII) and/or (IX) and/or (X) and/or (XI) and/or (Li) and/or (XIII) and/or (XIV) and/or (XV) and/or (XVI) and/or (XVI) and/or (XVII) and/or (XVIII) and/or (XIX) and/or (XX) and/or (XXI) and/or (XXII)

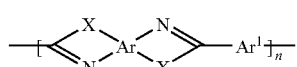

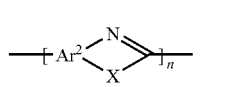

-continued
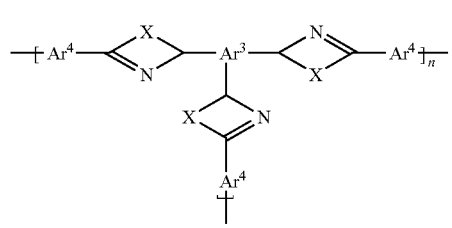 (III)
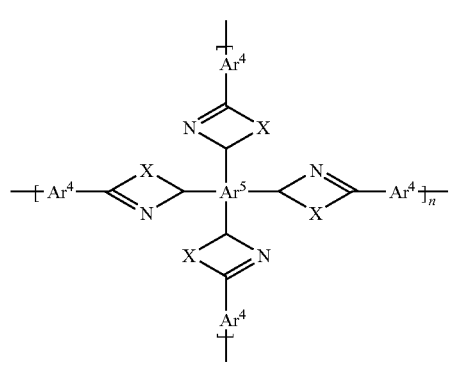 (IV)
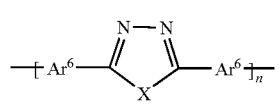 (V)
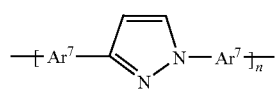 (VI)
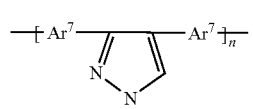 (VII)
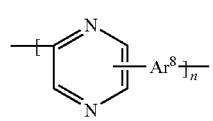 (VIII)
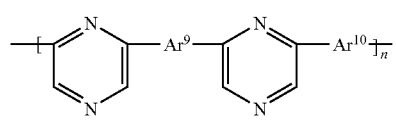 (IX)
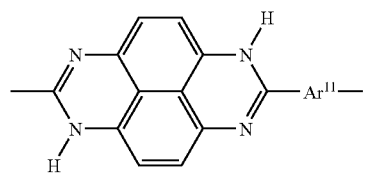 (X)
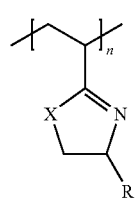 (XI)
-continued
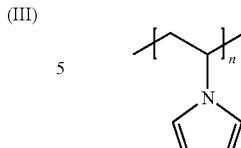 (XII)
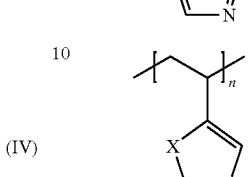 (XIII)
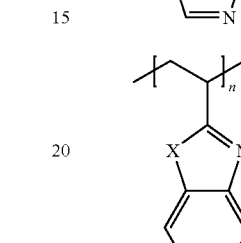 (XIV)
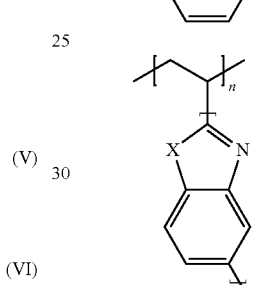 (XV)
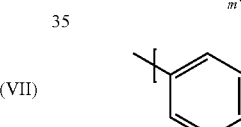 (XVI)
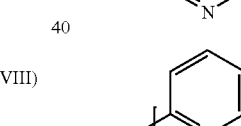 (XVII)
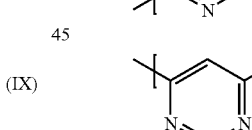 (XVIII)
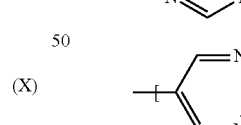 (XIX)
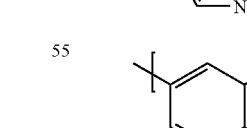 (XX)
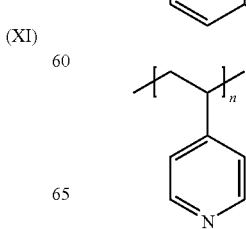 (XXI)

-continued

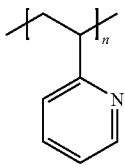

(XXII)

wherein
Ar are identical or different and are each a tetravalent aromatic or heteroaromatic group which may have one or more rings,
Ar¹ are identical or different and are each a divalent aromatic or heteroaromatic group which may have one or more rings,
Ar² are identical or different and are each a divalent or trivalent aromatic or heteroaromatic group which may have one or more rings,
Ar³ are identical or different and are each a trivalent aromatic or heteroaromatic group which may have one or more rings,
Ar⁴ are identical or different and are each a trivalent aromatic or heteroaromatic group which may have one or more rings,
Ar⁵ are identical or different and are each a tetravalent aromatic or heteroaromatic group which may have one or more rings,
Ar⁶ are identical or different and are each a divalent aromatic or heteroaromatic group which may have one or more rings,
Ar⁷ are identical or different and are each a divalent aromatic or heteroaromatic group which may have one or more rings,
Ar⁸ are identical or different and are each a trivalent aromatic or heteroaromatic group which may have one or more rings,
Ar⁹ are identical or different and are each a divalent or trivalent or tetravalent aromatic or heteroaromatic group which may have one or more rings,
Ar¹⁰ are identical or different and are each a divalent or trivalent aromatic or heteroaromatic group which may have one or more rings,
Ar¹¹ are identical or different and are each a divalent aromatic or hetero aromatic group which may have one or more rings,
X are identical or different and are each oxygen, sulfur or an amino group bearing a hydrogen atom, a group having 1-20 carbon atoms, preferably a branched or unbranched alkyl or alkoxy group, or an aryl group as further radical,
R are identical or different and are each hydrogen, an alkyl group or an aromatic group and
n and m are each an integer greater than or equal to 10.

12. The membrane as claimed in claim 11, which has a concentration in mole of phosphoric acid per repeating unit of formula (III)) from 12 to 40.

13. The membrane as claimed in claim 12, wherein the polyazole has an intrinsic viscosity of at least 1.4 dl/g.

14. A membrane-electrode unit comprising at least one electrode and at least one membrane as claimed in claim 8.

15. A fuel cell comprising one or more membrane-electrode units as claimed in claim 8.

16. The membrane as claimed in claim 8, wherein the polyazole has an intrinsic viscosity of at least 1.4 dl/g.

17. The membrane as claimed in claim 8, wherein said polyazole comprises recurring azole units of the formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVI) and/or (XVII) and/or (XVIII) and/or (XIX) and/or (XX) and/or (XXI) and/or (XXII)

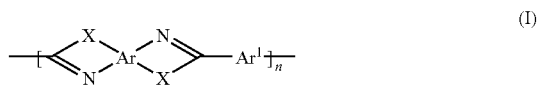

(I)

(II)

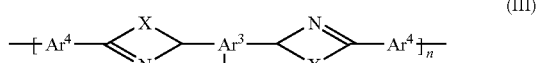

(III)

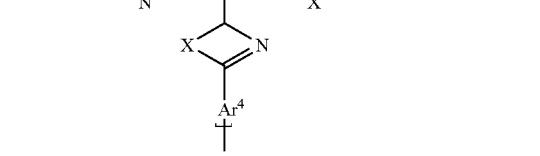

(IV)

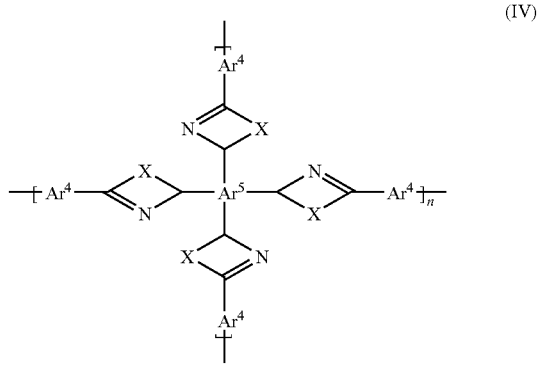

(V)

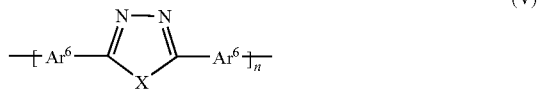

(VI)

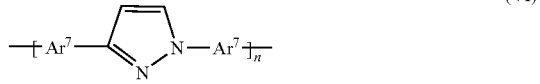

(VII)

(VIII)

(IX)

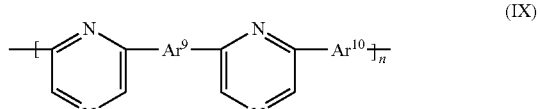

(X)

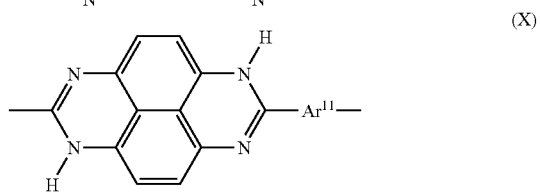

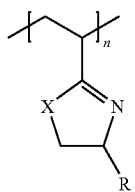
(XI)

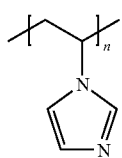
(XII)

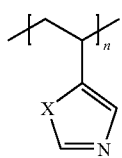
(XIII)

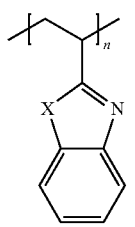
(XIV)

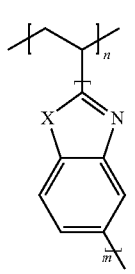
(XV)

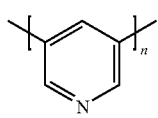
(XVI)

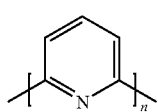
(XVII)

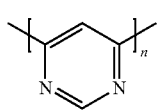
(XVIII)

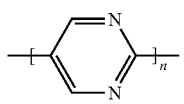
(XIX)

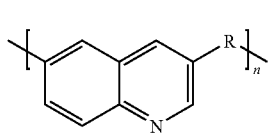
(XX)

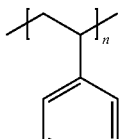
(XXI)

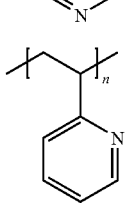
(XXII)

wherein

Ar are identical or different and are each a tetravalent aromatic or heteroaromatic group which may have one or more rings, $Ar^1$ are identical or different and are each a divalent aromatic or heteroaromatic group which may have one or more rings, $Ar^2$ are identical or different and are each a divalent or trivalent aromatic or heteroaromatic group which may have one or more rings, $Ar^3$ are identical or different and are each a trivalent aromatic or heteroaromatic group which may have one or more rings, $Ar^4$ are identical or different and are each a trivalent aromatic or heteroaromatic group which may have one or more rings, $Ar^5$ are identical or different and are each a tetravalent aromatic or heteroaromatic group which may have one or more rings, $Ar^6$ are identical or different and are each a divalent aromatic or heteroaromatic group which may have one or more rings, $Ar^7$ are identical or different and are each a divalent aromatic or heteroaromatie group which may have one or more rings, $Ar^8$ are identical or different and are each a trivalent aromatic or heteroaromatic group which may have one or more rings, $Ar^9$ Ar are identical or different and are each a divalent or trivalent or tetravalent aromatic or heteroaromatic group which may have one or more rings, $Ar^{10}$ are identical or different and are each a divalent or trivalent aromatic or heteroaromatic group which may have one or more rings, $Ar^{11}$ are identical or different and are each a divalent aromatic or heteroaromatic group which may have one or more rings, X are identical or different and are each oxygen, sulfur or an amino group bearing a hydrogen atom, a group having 1-20 carbon atoms, preferably a branched or unbranched alkyl or alkoxy group, or an aryl group as further radical, R are identical or different and are each hydrogen, an alkyl group or an aromatic group and n and m are each an integer greater than or equal to 10.

18. The membrane as claimed in claim 17, which has a concentration in mole of phosphoric acid per repeating unit of formula (III), from 10 to 50.

19. The membrane as claimed in claim 17, which has a concentration in mole of phosphoric acid per repeating unit of formula (III)) from 12 to 40.

20. An electrode provided with a proton-conducting polymer coating based on polyazoles which is obtained by a process comprising the steps
    A) Mixing of one or more aromatic tetraamino compounds with one or more aromatic carboxylic acids or esters thereof which contain at least two acid groups per carboxylic acid monomer, or mixing of one or more aromatic and/or heteroaromatic diaminocarboxylic acids, in polyphosphoric acid to form a solution and/or dispersion,
    B) Heating of the mixture in step A) to temperatures of up to 350° C. under inert gas to form the polyazole polymer,
    C) Application of a layer to an electrode using the mixture from step B),
    D) Treating the membrane formed in step C) by hydrolysis.

21. The electrode as claimed in claim 20, wherein the coating has a thickness of from 5 to 1500 μm.

22. A membrane-electrode unit comprising at least one electrode as claimed in claim 21 and at least one membrane.

23. A fuel cell comprising one or more membrane-electrode units as claimed in claim 22.

* * * * *

UNITED STATES PATENT AND TRADEMARK OFFICE
CERTIFICATE OF CORRECTION

| | | |
|---|---|---|
| PATENT NO. | : 7,582,210 B2 | |
| APPLICATION NO. | : 11/930764 | |
| DATED | : September 1, 2009 | |
| INVENTOR(S) | : Gordon Calundann et al. | |

It is certified that error appears in the above-identified patent and that said Letters Patent is hereby corrected as shown below:

In the Claims:

In Claim 10, in column 22, on line 51, "perature of 120°9 C." should read -- perature of 120° C. --

Signed and Sealed this

Second Day of February, 2010

David J. Kappos
*Director of the United States Patent and Trademark Office*